Jan. 3, 1956
R. W. GILBERT
2,729,781
ELECTROMAGNETIC TRANSFORMER
Filed Oct. 31, 1952
3 Sheets—Sheet 1
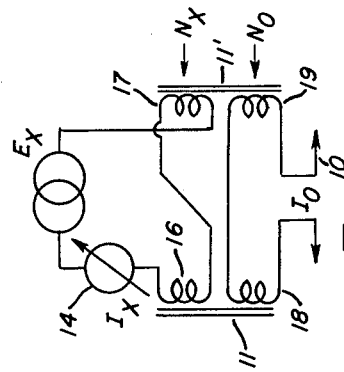
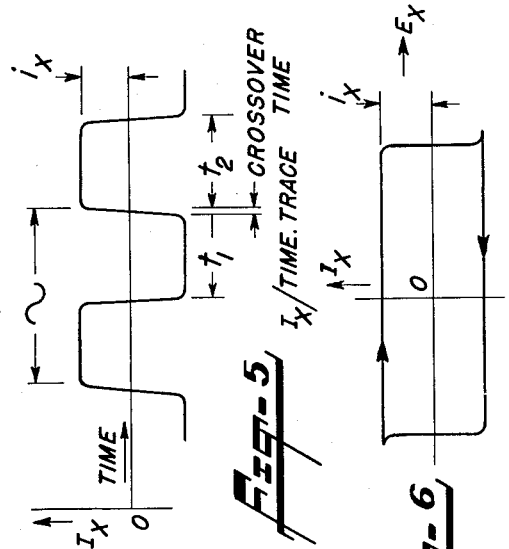
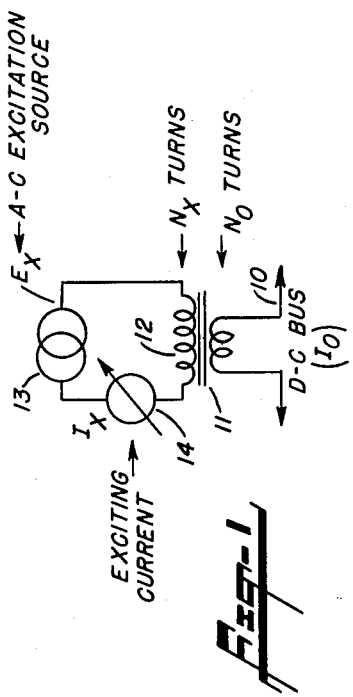
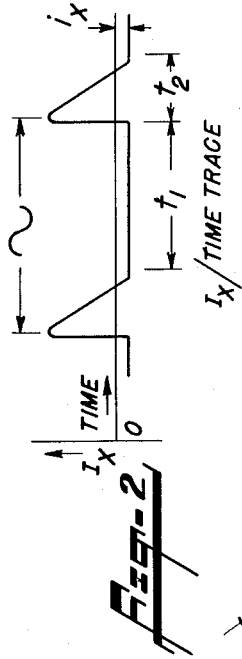
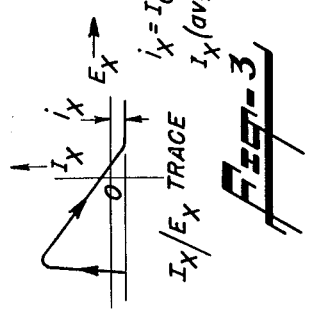
ROSWELL W. GILBERT
INVENTOR.
BY
ATTORNEYS

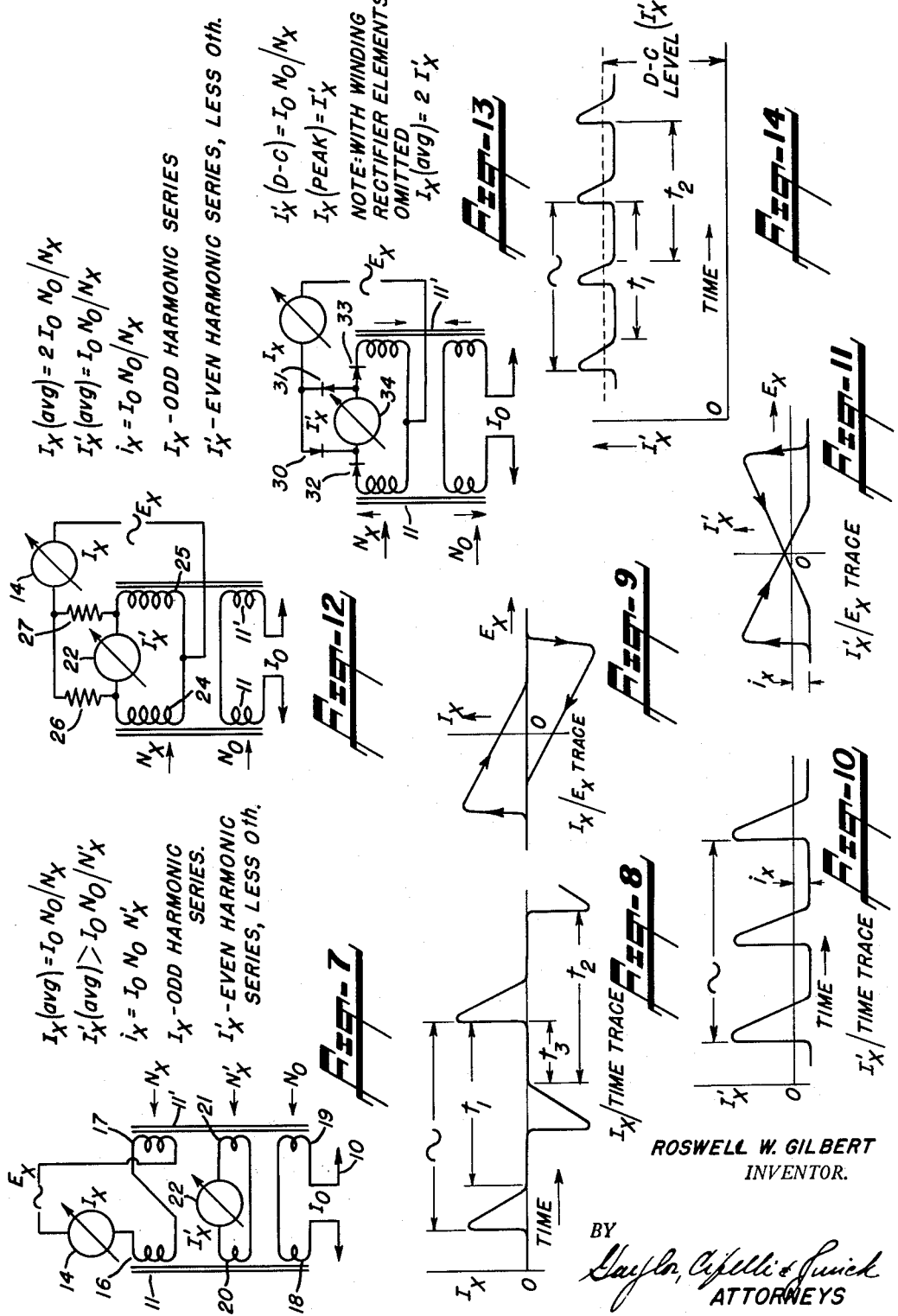

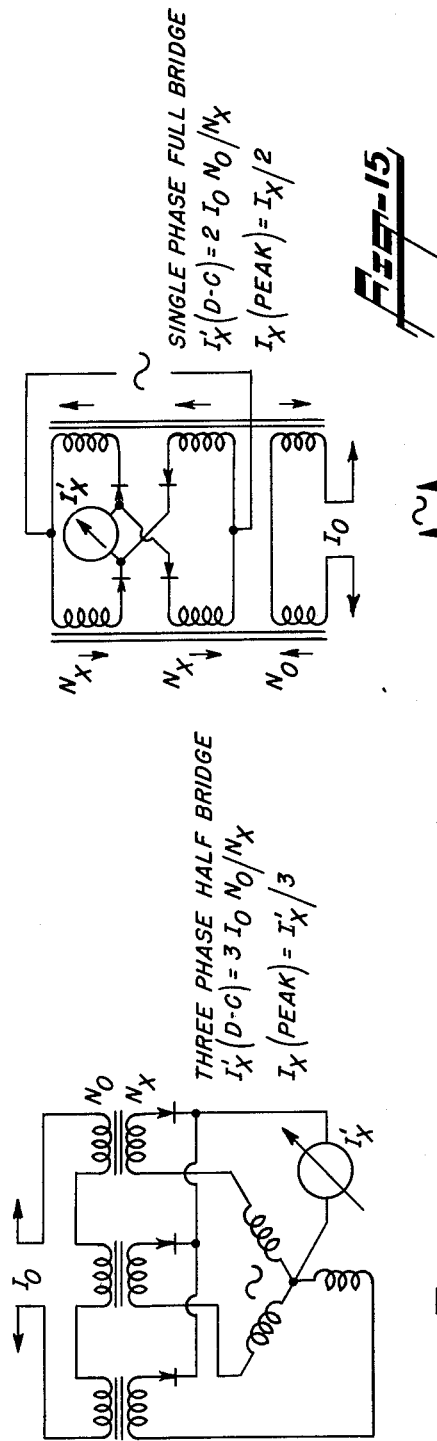
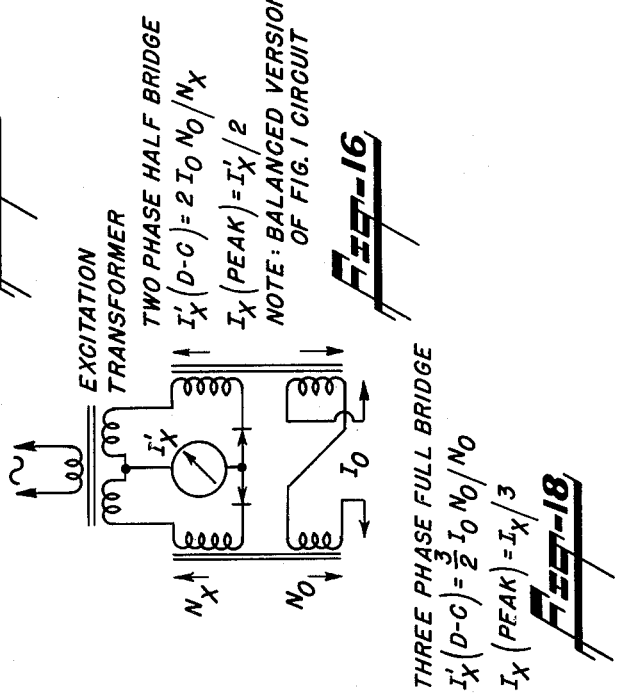
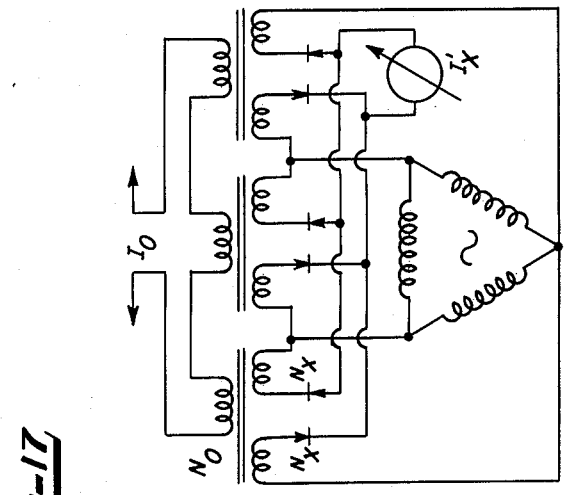
ROSWELL W. GILBERT
INVENTOR.

United States Patent Office 2,729,781
Patented Jan. 3, 1956

2,729,781

ELECTROMAGNETIC TRANSFORMER

Roswell W. Gilbert, Montclair, N. J., assignor to Weston Electrical Instrument Corporation, Newark, N. J., a corporation of New Jersey Application October 31, 1952, Serial No. 317,898

1 Claim. (Cl. 321—25)

This invention relates to apparatus for the measurement of D.-C. currents and more particularly to a novel electromagnetic transformer arrangement having advantages of simplicity, permanency and a high operating precision.

D.-C. transformers, or so-called transductors, are finding increasing application in the field of relatively large D.-C. current measurement since they offer many advantages over the usual D.-C. instrument and shunt combinations. While structurally simple, the operation of a D.-C. transformer in common with other dynamic magnetic devices, is difficult to analyse. The flux linkage exchange relationships, even in steady-state operation, are complex by reason of the fact that they involve coupled inductors having abruptly non-linear characteristics.

As applied to a bus carrying a heavy D.-C. current to be measured, my electromagnetic transformer consists of two core sections encircling the bus, each core carrying separate exciting windings. The cores are made, preferably, of tape-wound rectangular hysteresis loop material having a coercive force that is very small with respect to the magnetizing force represented by full-scale bus current. Thus, when an exciting voltage is applied to the windings an exciting current will develop to the point where the bus magnetization is equalled. At such point, the core abruptly becomes permeable and a flux swing will limit the exciting current sharply to equality with the bus current multiplied by the turns ratio. The exciting windings are cyclically excited by alternating current having a potential-time integral per cycle not greater than the flux linkage of the core in terms of potential-time. Thus, excitation will swing from core to core before the flux-linkage integral of the cores can be penetrated, whereby the exciting current is a function of the bus current and, therefore, can be taken as a measure thereof.

An object of this invention is the provision of a novel transformer for the measurement of D.-C. currents.

An object of this invention is the provision of an arrangement for measuring D.-C. current flowing in a conductor and comprising a pair of cores magnetically coupled to the conductor, means including windings carried by each core for cyclically exciting the cores by an alternating current, and means for measuring the current flowing in the said windings in terms of the D.-C. current value multiplied by the turns ratio between the said conductor and the said windings.

An object of this invention is the provision of an arrangement for measuring D.-C. current flowing in a conductor and comprising a plurality of cores, preferably made of a material having a low coercivity and a rectangular hysteresis loop, and adapted to be magnetically coupled to the conductor, exciting windings carried by the cores, rectifier elements connected between the windings and a D.-C. secondary circuit, and means for alternately exciting the cores by an A.-C. potential.

An object of this invention is the provision of an electromagnetic D.-C. transformer comprising a plurality of cores, input and output circuits including windings coupled by the cores, means for impressing the D.-C. current to be transformed into said input circuit, means for exciting the output circuit from a source of A.-C. potential, and rectifier means in said output circuit for establishing a flow of D.-C. current therein to automatically maintain a continuous flux linkage between the input and output circuits.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 is a circuit diagram showing an illustrative, single-core system that is presented for purposes of description;

Figure 2 is a graph showing the waveform trace of exciting current against time as developed in the Figure 1 system;

Figure 3 is a graph showing the waveform trace of the exciting current against exciting potential as developed in the Figure 1 system;

Figure 4 is a circuit diagram showing a conventional two-core system arranged for series excitation;

Figures 5 and 6 are graphs showing the waveform traces of the exciting current against time and against exciting potential, respectively, as developed in the Figure 4 system;

Figure 7 is similar to the Figure 4 two core system but with a coupling circuit added for purposes of description;

Figures 8 and 9 are graphs showing the waveform traces of the exciting current against time and against the exciting potential, respectively, as developed in the excitation windings of the Figure 7 system;

Figures 10 and 11 are similar graphs of the coupling current;

Figure 12 is a circuit diagram showing a modification of the Figure 7 system and wherein the excitation windings also serve as the coupling windings;

Figure 13 is a modification of the Figure 12 system and in which the circuit is rectifier-excited, in accordance with this invention;

Figure 14 shows the waveform of the current flowing in the D.-C. measuring instrument of the Figure 13 system;

Figure 15 shows a single-phase, full-bridge modification of the Figure 13 system;

Figure 16 shows a two-phase, half-bridge modification of the Figure 1 system;

Figure 17 shows a three-phase, half-bridge modification of the Figure 13 system; and Figure 18 shows a three-phase, full-bridge modification of the Figure 13 system.

Referring now to Figure 1, there is shown a single core system that is not normally used and is presented only for purposes of illustration and description. Here the D.-C. conductor 10, carrying a current $I_0$, is coupled to a core 11 by $N_0$ turns. The core carries the exciting winding 12, having $N_x$ turns, which is energized by an alternating current excitation source 13 having a voltage $E_x$, resulting in an excitation current flow $I_x$ as measured by the instrument 14. Although the excitation potential $E_x$ is sinusoidal the exciting current $I_x$ has an extensive region where the instantaneous value $i_x$ is constant, as shown in the excitation current-time trace of Figure 2. In this region the excitation current is in substantial balance against the bus-current excitation and the core is permeable. In this region the exciting winding is highly reactive and holds the excitation current constant until the exciting potential is reversed for a sufficient time to swing the flux linkage, at which point the core again becomes abruptly saturated. The exciting current then peaks, as shown, to a waveform determined by the exciting circuit loop potential and impedance. The value of $i_x$, therefore, is equal to the current in the bus multiplied by the turns ratio except for a range of indeterminancy due to the coercivity of the core. If this is small compared to the bus current-turns product the relationship is precise. Now, if the excitation level is increased by either increasing the potential $E_x$ or decreasing the loop impedance, the peaks of the excitation current $I_x$ will increase in amplitude and decrease in width. As these peaks approach zero width and infinite height, it will be apparent that the flat region of $I_x$ becomes complete. Also, as the area under the peak and above the flat region, with respect to the zero axis, are equal, the average value of the $i_x$ current wave will approach $2i_x$ as a limit.

Thus, as the excitation is increased the average value of the exciting current $I_x$ approaches a value:

$$I_x \text{ (avg.)} > 2I_0 \frac{N_0}{N_x} \qquad (1)$$

and for all levels of excitation sufficient to produce a flat:

$$i_x = I_0 \frac{N_0}{N_x} \qquad (2)$$

In operation, the core is flux-linked during the time $t_1$ and is saturated during the time $t_2$. Current is supported during the difference time despite the reversal of $E_x$ by the reaction of flux linkage.

The above-described single core system normally is impractical because the average of $I_x$ has a high coefficient of excitation level. However, the system could be made effective by some method for measuring the current $i_x$ only.

Figure 4 shows a conventional two-core, series excitation arrangement. Here the excitation potential $E_x$ is applied to the two excitation coils 16, 17 in series opposition to the D.-C. magnetization resulting from the flow of bus current in the windings 18, 19, so that for any instantaneous condition the exciting current is aiding in one core and opposing in the other. In this arrangement the cores 11, 11', are alternately balanced, one saturating while the other is flux-linked. The cross-over action ideally is abrupt, developing a square wave wherein the crest level $i_x$, Figure 5, is balancing each core in turn, so that:

$$I_x \text{ (avg.)} = i_x = I_0 \frac{N_0}{N_x} \qquad (3)$$

This relationship, however, depends upon the sharpness of the cross-over. If the exciting circuit loop includes inductance the rise-time will be increased and an excitation level coefficient will result. During cross-over neither core is reactive.

The Figure 4 arrangement can be improved considerably by adding a coupling circuit as shown in Figure 7, the coupling circuit comprising the coils 20, 21 and the indicating instrument 22. The action of the Figure 7 is now quite different and resort must be had to experimentally-derived waveform traces for a functional explanation.

The coupling circuit is balanced with respect to the excitation windings 16, 17 so that, effectively, the coupling winding will carry only differential distortion products developing against the non-linearity of the cores which are, essentially, the distortion products developed in the exciting circuit but shifted up one harmonic number. Therefore, the excitation current comprises an odd harmonic series with no even harmonics whereas the coupling current comprises an even harmonic series with no odd harmonics. The harmonic shift is plus one (+1) so that the coupling current has no 0th harmonic (D.-C.) which would result from a minus one (−1) shift. This, incidentally, is the reason for the impossibility of devising a magnetic rectifier using non-linear magnetic elements.

The two sets of waveform traces shown in Figures 8, 9 and 10, 11 show the exciting current $I_x$ and the coupling current $I'_x$, respectively. It is to be noted that the coupling current waveform appears as if it were the exciting current rectified except for the true A.-C. position of the zero axis.

Attention is directed to the current/time trace of the coupling current shown in Figure 10. During periods of zero exciting current ($I_x$) the coupling current has a value $i_x$ represented by the distance from the zero axis to the flat region as before, and also as before, the level $i_x$ is the measure of the bus current. Consider now that the coupling current comprises two components, namely, a steady level of D.-C. equal to $i_x$ and the current pulses in opposite polarity measured from the $i_x$ level as an axis. These two components have equal and opposite average values to establish the A.-C. zero axis and furthermore, being equal, the averaged value of the pulse component (measured from the $i_x$ axis) is equal to $i_x$. The pulse component is directly derived by flux linkage from the exciting current pulses, as in a transformer. This infers that the average value of the exciting current is representative of the instantaneous value of $i_x$, which is strictly true, and the exciting current is a measure of the bus current level as set forth in Equation 3, above.

The specific advantage of the Figure 7 circuit over the Figure 4 circuit is that the coupling current maintains balance when the exciting current is zero and the system becomes substantially independent of source impedance and winding resistance, within practical limits. Referring to the excitation current/time trace of Figure 8, one core is flux-linked during the time $t_1$, the other core is flux-linked during the time $t_2$, and both cores are flux-linked during the time $t_3$. It appears that a criterion for proper operation is that at least one core be flux-linked at all times, which is not the case during the cross-over time in the system of Figure 4.

In Figure 12 I show a circuit arrangement wherein the exciting windings 24, 25 also serve as the coupling windings. One circuit junction is arranged to include the indicating instrument 22 responsive to the coupling current but balanced with respect to the exciting current by a pair of matched resistors 26, 27. The action of this circuit is similar to that of the Figure 7 circuit and, in a network sense, the two circuits are equivalent. The traces of the excitation and coupling currents are identical except that the parallel connection changes the ratio relationship whereby:

$$I_x \text{ (avg.)} = 2I_0 \frac{N_0}{N_x} \qquad (4)$$

The shunt excitation circuit of Figure 12 can be further modified to a rectifier-excited circuit as shown in Figure 13. The excitation balancing resistors 26, 27, shown in the Figure 12 circuit, are replaced by diode rectifier elements 30, 31 in the Figure 13 circuit and a D.-C. indicating instrument 34 is connected as in a half-bridge rectifier. The diode polarities with respect to forward current relative to the bus magnetization preferably are as shown by the arrow directions.

The D.-C. instrument 34 now responds directly to the transiently level current $i_x$ plus the exciting current crossing over to charge the flux-linkage in the opposite core. The net result is a substantially pure D.-C. instrument current having an average value equal to $i_x$. This, then, realizes the theoretical objective wherein the indicated current is derived entirely by flux-linkage, the steady component being maintained by flux relapse plus the component crossing over to restore the relapsed flux integral.

The diodes 32 and 33, connected in series with the excitation windings 24, 25, serve to direct the charging cross-over current which improves the operating efficiency of the system. Such diodes may actually be omitted in which case the exciting current $I_x$ will have an average value of $2I'_x$. However, with the diodes 33, 34 included in the circuit the exciting current is limited substantially to the peak value of $I'_x$ and the average and r. m. s. values both are reduced substantially. This action is similar to other rectifier circuits including inductance wherein an impedance transformation is effective, and the D.-C. current approaches an integral equality with the peak value rather than the average of the impressed current. While the precise functioning of the circuit is not completely understood careful measurements indicate that the average value of the instrument current, including the cross-over charging components, is rigorously related to the balanced condition against bus current. The measured waveform of the instrument current is as shown in Figure 14. As the excitation level is changed the form of the charging peaks is altered materially but without affecting the average value with respect to the D.-C. zero axis.

It may here be pointed out that the diodes of the Figure 13 circuit are operated under conditions where simultaneous conduction is minimized. A pure-current condition is realized wherein the actual loop impedance of the excitation circuit is immaterial so that simultaneous conduction of the diodes is the only possible rectifier fault. This dictates the preferred use of thermionic diodes of the gas type, in which case rectification is substantially perfect. Also, such thermionic diodes would be the only practical rectifiers for the high balancing currents required, for example, by bus current levels above 20,000 amperes where magnetic converters are particularly desirable.

I have constructed and tested apparatus as illustrated in the Figure 13 arrangement and operating in the range of 100 ampere turns. This unit had a ratio precision of a fraction of one percent and a coefficient of excitation level of about 0.005 which is adequate for most purposes. Such unit also proved that calibration or adjustment is unnecessary, similar to A.-C. current transformers. A second unit was constructed to operate at 10,000 ampere-turns. As expected, the ratio deviation was only about 0.03 percent. Since magnetic systems characteristically improve with size truly-precise operation may be expected in large units.

Having now illustrated and explained the plural core, rectifier-excitation circuit of my novel system for the measurement of relatively large D.-C. currents, those skilled in this art will have no difficulty in making further modifications thereof for specific applications. In this respect reference is made to Figure 15 which shows a single-phase, full-bridge modification of the Figure 13 system. Figure 16 illustrates a two-phase, half-bridge arrangement which is a modification of the Figure 1 system. Figures 17 and 18 are three-phase, full-bridge and three-phase, half-bridge modifications of the Figure 13 system. In view of the foregoing description of my novel circuit it is believed the Figures 15–18 modifications are self-explanatory.

Further changes and modifications will suggest themselves to those skilled in this art and it is intended that such changes and modifications shall fall within the spirit and scope of the invention as set forth in the following claim.

I claim:

Apparatus for the ratio transformation of direct current and comprising input and output circuits, a pair of saturable magnetic cores, a primary winding linking each of said cores and connected to the input circuit, single identical secondary windings linked to each core and connected in series to the output circuit, diode rectifier elements connected in series with each of the secondary windings, and a source of alternating current excitation connected to the secondary windings in parallel relationship, the magnitude of the alternating current being sufficient to maintain a magnetic flux linkage in at least one of the cores at all times, thereby to maintain substantially equal magnetization alternately in each of the secondary and primary windings.

References Cited in the file of this patent

UNITED STATES PATENTS

| | | |
|---|---|---|
| 2,403,891 | Lamm | July 9, 1946 |
| 2,459,069 | Fitzgerald | Jan. 11, 1949 |
| 2,525,451 | Graves | Oct. 10, 1950 |
| 2,552,203 | Morgan | May 8, 1951 |
| 2,567,725 | Morgan | Sept. 11, 1951 |